(12) United States Patent
Varigas

(10) Patent No.: US 11,180,252 B2
(45) Date of Patent: Nov. 23, 2021

(54) AIRCRAFT WITH VARIABLE-GEOMETRY RHOMBOHEDRAL WING STRUCTURE

(71) Applicant: FLY-R, Saint-Paul (FR)

(72) Inventor: François Varigas, Saint-Paul (FR)

( * ) Notice: Subject to any disclaimer, the term of this patent is extended or adjusted under 35 U.S.C. 154(b) by 131 days.

(21) Appl. No.: 16/490,545

(22) PCT Filed: Mar. 2, 2018

(86) PCT No.: PCT/FR2018/050486
§ 371 (c)(1),
(2) Date: Sep. 1, 2019

(87) PCT Pub. No.: WO2018/158549
PCT Pub. Date: Sep. 7, 2018

(65) Prior Publication Data
US 2019/0382115 A1   Dec. 19, 2019

(30) Foreign Application Priority Data

Mar. 2, 2017 (FR) ...................................... 1751711

(51) Int. Cl.
*B64C 39/06* (2006.01)
*B64C 3/38* (2006.01)
*B64C 3/54* (2006.01)

(52) U.S. Cl.
CPC .............. *B64C 39/068* (2013.01); *B64C 3/38* (2013.01); *B64C 2003/543* (2013.01)

(58) Field of Classification Search
CPC ......... B64C 39/068; F42B 10/12; F42B 10/18
See application file for complete search history.

(56) References Cited

U.S. PATENT DOCUMENTS

| | | | | |
|---|---|---|---|---|
| 3,942,747 A * | 3/1976 | Wolkovitch | .......... | B64C 39/068 244/13 |
| 4,364,531 A * | 12/1982 | Knoski | .................... | F42B 10/20 244/3.27 |
| 5,039,030 A * | 8/1991 | Kraus | ..................... | F42B 10/14 244/3.28 |
| 5,078,339 A * | 1/1992 | Lapidot | ..................... | B64C 3/56 244/49 |
| 5,615,846 A * | 4/1997 | Shmoldas | ............. | F42B 15/105 244/3.26 |
| 5,899,410 A * | 5/1999 | Garrett | .................. | B64C 39/068 244/45 R |
| 6,986,481 B2 * | 1/2006 | Fanucci | ................ | B64C 39/068 244/3.26 |

(Continued)

*Primary Examiner* — Joseph W Sanderson
(74) *Attorney, Agent, or Firm* — PatShegen IP; Moshe Pinchas

(57) ABSTRACT

The aircraft (10) comprises a fuselage (11) and a rhombohedral wing structure (12) comprising front wings (13, 14) mounted on a front wing-root support (17) and rear wings (15, 16) mounted on a rear wing-root support (18). One end of each front wing is articulated to one end of a rear wing and at least one of the wing-root supports is able to move along the fuselage. The wing-root supports (17, 18) are positioned respectively underneath and on top of the fuselage (11).
The length (41) of the rear wings (15, 16) is strictly less than the length (48) of the front wings (13, 14).
The aircraft (10) comprises an adaptor for adapting the position of each wing root (17, 18) to suit the flight conditions.

12 Claims, 6 Drawing Sheets

(56) References Cited

U.S. PATENT DOCUMENTS

| | | | | |
|---|---|---|---|---|
| 7,131,611 | B2* | 11/2006 | Ferman | B64C 3/385 |
| | | | | 244/39 |
| 7,249,734 | B2* | 7/2007 | Yurkovich | B64C 3/40 |
| | | | | 244/46 |
| 7,841,559 | B1* | 11/2010 | O'Shea | B64C 39/024 |
| | | | | 244/46 |
| 8,757,538 | B2* | 6/2014 | Seifert | B64C 3/546 |
| | | | | 244/46 |
| 2004/0217230 | A1* | 11/2004 | Fanucci | B64C 39/068 |
| | | | | 244/46 |
| 2006/0022085 | A1* | 2/2006 | Ferman | B64C 39/068 |
| | | | | 244/45 R |
| 2007/0120007 | A1* | 5/2007 | Yurkovich | B64C 39/068 |
| | | | | 244/46 |
| 2010/0282917 | A1* | 11/2010 | O'Shea | B64C 39/024 |
| | | | | 244/218 |
| 2012/0085858 | A1* | 4/2012 | Seifert | B64C 3/42 |
| | | | | 244/46 |
| 2020/0149848 | A1* | 5/2020 | O'Shea | F42B 10/18 |

* cited by examiner

AIRCRAFT WITH VARIABLE-GEOMETRY RHOMBOHEDRAL WING STRUCTURE

TECHNICAL FIELD

The present invention relates to an aircraft with a variable-geometry rhombohedral wing structure. It applies, in particular, to airplanes whose variable-geometry wing structure enables them to arrange the wings in configurations suitable for a large flight envelope and flight regimes.

STATE OF THE ART

Since the beginning of aeronautics, designers have always been concerned with designing an airplane that has the largest flight envelope possible while minimizing the structure's mass. Reminder: the flight envelope of an aircraft is the range in terms of airspeed, load factor and altitude within which it can operate safely.

With new technologies, new materials and ever more powerful computation means, new designs of aircraft are appearing.

Rhombohedral, closed, diamond, slotted, ring and other wings have been considered since the very beginnings of aviation. It wasn't until fairly recently that aerodynamic thrust studies, thanks to new computational and digital simulation tools, demonstrated their potential gain in terms of induced drag, even if this gain is relatively modest (in the order of a few percent). However, the mass of the structure is significantly reduced (a gain of about 30%) by the natural bracing of the wings to each other, but at the price of increased rigidity.

With regard to the increase in the flight envelope, the various flaps and additional appendages of the wing structure have the drawback of increasing the weight of the aircraft and/or the drag.

Document US 2010/282917 is known, which describes, as shown in its FIG. 3 and in paragraphs 41 and 44, an aircraft whose wings are in parallel planes (a configuration known as a "biplane"). This wing structure therefore has the drawbacks of biplane wing structures.

Document U.S. Pat. No. 5,899,410 is also known, which describes an aircraft having a single-plane wing structure configuration, all the wings being in the same plane, as shown in its FIGS. 1 and 3 and described in the portion "field of the invention" and in the abstract. This wing structure therefore has the drawbacks of monoplane wing structures.

Document US 2004/217230 is also known, which has a single-plane wing structure configuration: all the wings are in the same plane, as shown in FIGS. 1 and 16. This wing structure therefore has the drawbacks of monoplane wing structures.

Document U.S. Pat. No. 7,131,611 is also known, which has a single-plane wing structure configuration, all the wings being in the same plane, as shown in FIGS. 4 and 7. This wing structure therefore has the drawbacks of monoplane wing structures.

DESCRIPTION OF THE INVENTION

The present invention aims to remedy all or part of these drawbacks.

To this end, according to a first aspect, the present invention relates to an aircraft comprising a fuselage and a rhombohedral wing structure comprising front wings mounted on a front wing-root support and rear wings mounted on a rear wing-root support, the wing-root supports being positioned respectively under and on the top of the fuselage, wherein:
one end of each front wing is articulated to one end of a rear wing and
at least one of the wing-root supports is able to move along the fuselage.

Therefore, to remedy the drawbacks presented above, while significantly increasing the flight envelope and overall performance levels of an airplane, the invention consists of a rhombohedral type of wing structure in which the front and rear wings have a variable geometry, while remaining joined at their ends in order to obtain very different shapes. In addition, the modification of the wing structure's geometry enables easy transport of the aircraft that is the subject of the present invention.

In some embodiments, the length of the rear wings is strictly shorter than the length of the front wings, the angle formed between the main longitudinal axis of the fuselage and the main axis of the rear wings therefore being, in all flight configurations, more obtuse than the angle formed between the main longitudinal axis of the fuselage and the main axis of the front wings.

Thanks to these provisions, the front wings are always in a swept-wing configuration and the rear wings can be in a swept-forward, straight (i.e. perpendicular to the fuselage), or swept-back configuration, or in any of the intermediate configurations.

In some embodiments, at least one of the wing-root supports is configured to come closer to the other wing-root support so that the front wings form the hypotenuses of right-angle triangles formed by the front wings, the rear wings and the fuselage, the main axis of each of the rear wings being, in these right-angle triangles, perpendicular to the main longitudinal axis of the fuselage.

In some embodiments, at least one of the wing-root supports is configured to come closer to the other wing-root support so that the front wings and the rear wings are in swept-back configurations.

Thanks to these provisions, the sweep of the front wings can be increased and the span reduced, in particular for flight configurations at the highest speed.

In some embodiments, at least one of the wing-root supports is configured to move away from the other wing-root support so that the aircraft's span is less than the sum of four times the maximum width of the front wings and the rear wings, firstly, and the width of the fuselage, secondly.

Thanks to these provisions, the aircraft can be transported, even catapulted, with a wing configuration constricted against the fuselage, with a minimum span. After catapulting in this minimum-span configuration, the span is increased by bringing the wing roots closer.

In some embodiments, the aircraft that is the subject of the invention comprises a means for adjusting the position of each wing root to suit the flight conditions.

Thanks to these provisions, during the flight, depending on the payload, speed, altitude, target autonomy and target maneuverability, the adjustment means alters the geometric configuration of the wing structure by moving at least one wing root.

In some embodiments, the aircraft that is the subject of the invention comprises means for morphing the wing structure, to alter the inclination of the wings' axes of rotation and cause a variation of incidence, the adjustment means controlling the morphing means.

Thanks to these provisions, during the flight, depending on the payload, speed, altitude, target autonomy and target maneuverability, the adjustment means alters the incidence of the wing structure.

In some particular embodiments, each of the wing-root supports is able to move along the fuselage.

Thanks to these provisions, the geometric configuration of the wing structure can be adjusted for any distribution of mass or thrust.

In some embodiments, at least one wing-root support is put into motion by a motor, a control unit actuating said motor.

Thanks to these provisions, the center of thrust of the wing structure can be moved from front to back on the fuselage, independently of the geometry of the wing structure dictated by the distance between the wing-root supports.

In some embodiments, at least one wing-root support comprises a rail and a worm screw.

Thanks to these provisions, the movement of the wing-root supports is easy.

In some embodiments, a vertical surface for closing wing ends is positioned at each junction of the front and rear wing ends.

These vertical surfaces for closing wing ends allow the drag of the wing structure to be reduced.

In some embodiments, a rod inside one of the wings keeps the main plane of the vertical surfaces for closing wing ends parallel of the main axis of the fuselage.

Thanks to these provisions, the junctions of the front and rear wings can be simplified because their function is not to keep the plane of the vertical surfaces for closing wing ends in position.

In some embodiments, the junctions of the front and rear wing ends comprise pivots.

In some embodiments, at least one front wing-root support comprises at least one pivot.

In some embodiments, the aircraft that is the subject of the present invention comprises means for morphing the wing structure, to alter the inclination of the wings' axes of rotation and cause a variation of incidence.

In some embodiments, the fuselage has no vertical tail.

BRIEF DESCRIPTION OF THE FIGURES

Other advantages, aims and characteristics of the present invention will become apparent from the description that will follow, made, as an example that is in no way limiting, with reference to the drawings included in an appendix, wherein.

DESCRIPTION OF EMBODIMENTS OF THE INVENTION

It is now noted that the figures are not to scale. To simplify the understanding of the drawings and schematics, the wings and vertical surfaces at the junction of the wing ends are represented by thin surfaces.

It is noted that a rhombohedral (or rhombohedric) wing structure is a variant of a tandem wing in which the ends come together. The front wing fixed on the lower portion of the fuselage is in a swept-back configuration, and the rear wing fixed on the upper portion of the fin is in a swept-forward configuration; the complete wing, referred to as a joined wing, forms a continuous projected surface formed of a hollow rhombus.

Figure 1:
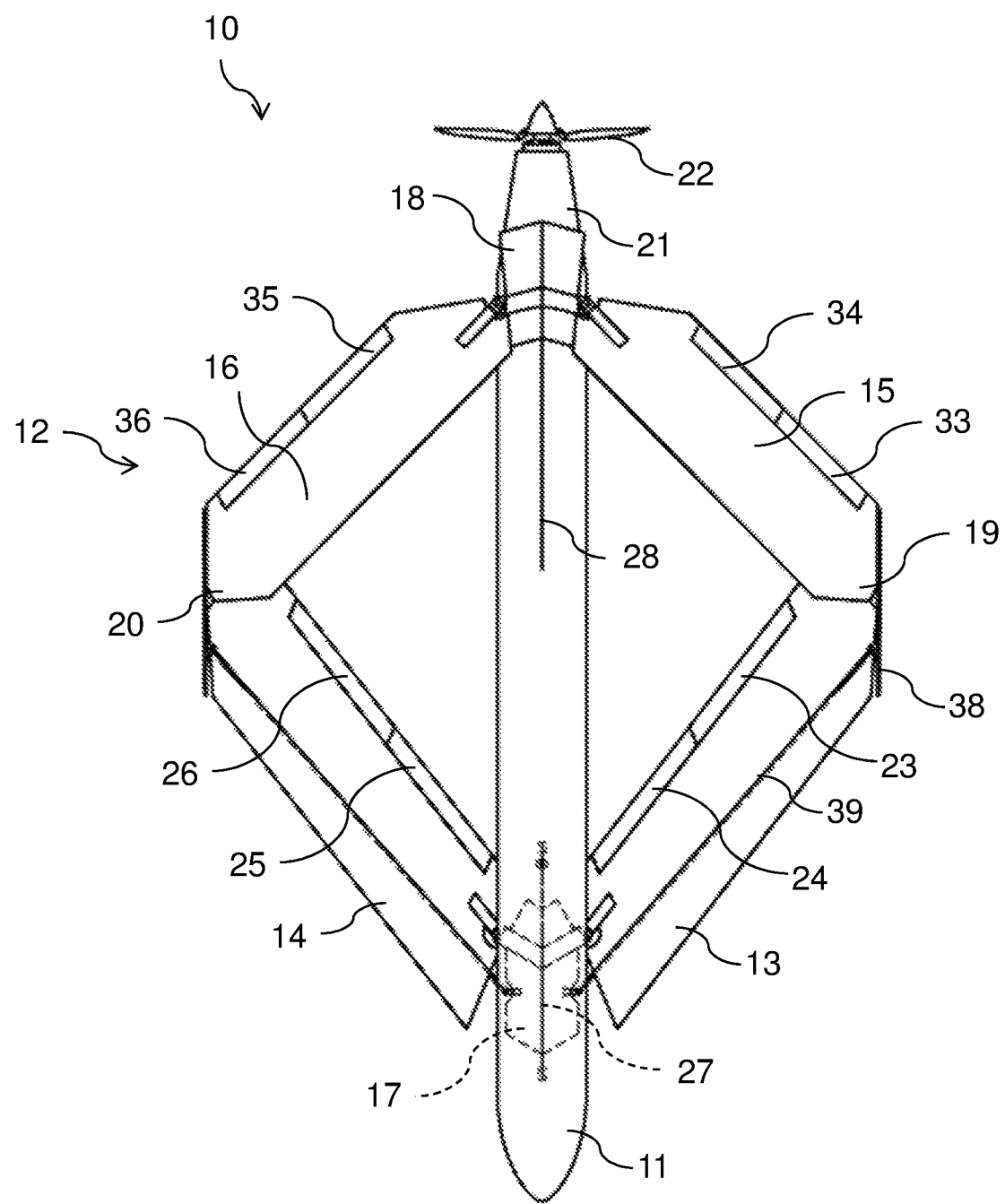
FIG. 1 represents, schematically and in a top view, a particular embodiment of the aircraft that is the subject of the present invention, in an intermediate wing structure configuration.

FIG. 1 shows an aircraft 10 comprising a fuselage 11 and a rhombohedral-shaped wing structure 12. The wing structure 12 comprises a left front wing 13, a right front wing 14, a left rear wing 15, and a right rear wing 16. The front wings 13 and 14 come together on a front wing-root support 17 situated under the fuselage 11. The rear wings 15 and 16 come together on a rear wing-root support 18. The left wings 13 and 15 come together on a left wing junction 19 situated above the fuselage 11. The right wings 14 and 16 come together on a right wing junction 20. The wings 13, 14, 15 and 16 represented in the figures are broadly rectangular in shape. They are therefore constant-chord wings, their leading edges and trailing edges being parallel. Of course, the present invention is not limited to this type of general form but extends to all wing shapes other than delta wings.

The front wings 13 and 14 have control surfaces 23 to 26, ailerons or flaps. The rear wings 15 and 16 have control surfaces 33 to 36, ailerons or flaps.

A motor 21 rotationally drives a propeller 22 to propel the aircraft 10. The aircraft 10 shown in the figures is propelled by a propeller located at the rear of the fuselage 11. Of course, the present invention is not limited to this type of propulsion but extends to other types of motor and other types of arrangement of one or more motors on the fuselage, for example, in front or inside lateral nacelles borne by the fuselage.

The junction of the left wing ends 19 is articulated, which enables a relative angular movement of the left front wing 13 relative to the left rear wing 15. In the same way, the junction of the right wing ends 20 is articulated, which enables a relative angular movement of the right front wing 14 relative to the right rear wing 16.

Figure 2:
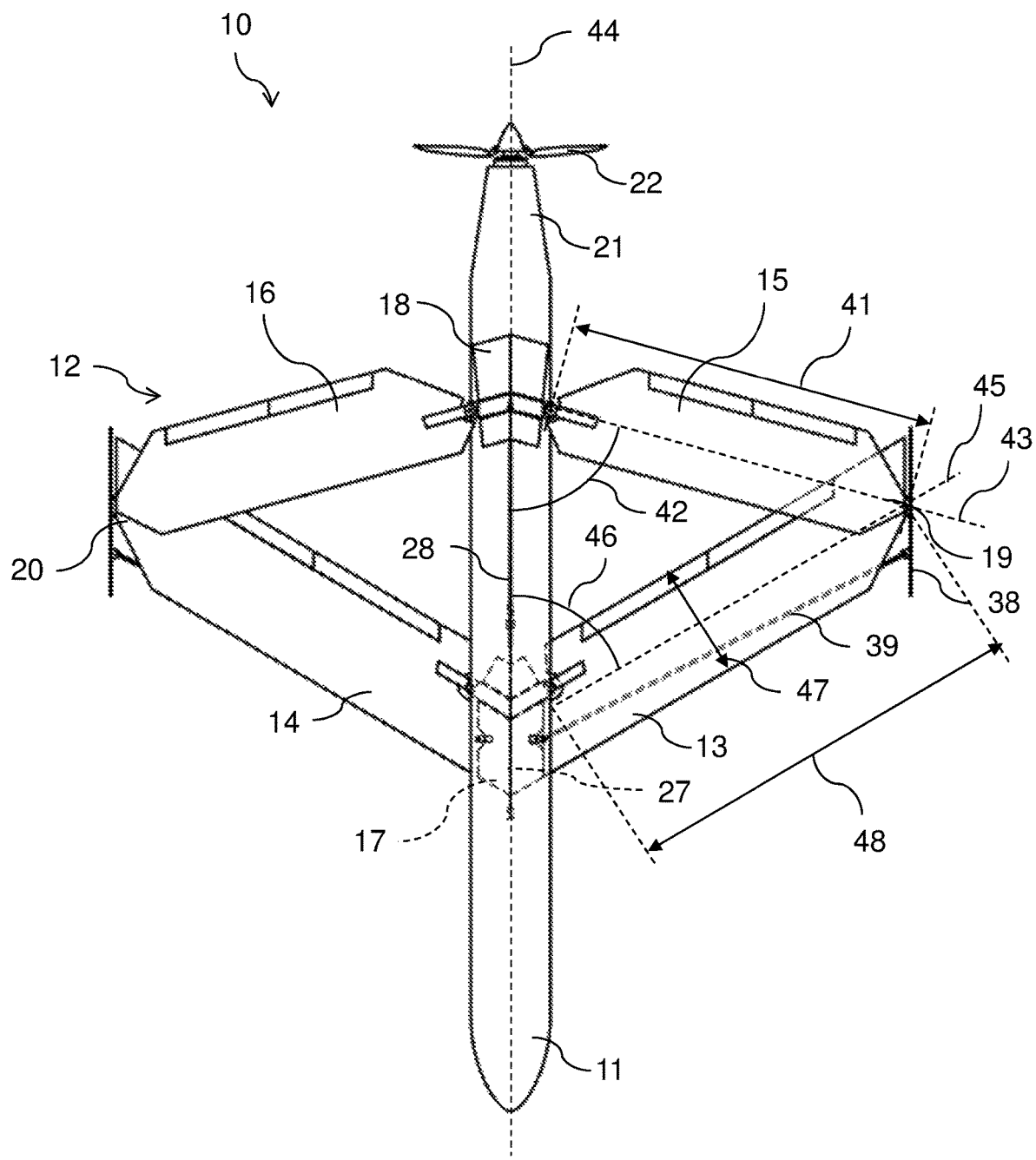
FIG. 2 represents, schematically and in a top view, the aircraft shown in FIG. 1 in a wing structure configuration with a low sweep angle.
Figure 3:
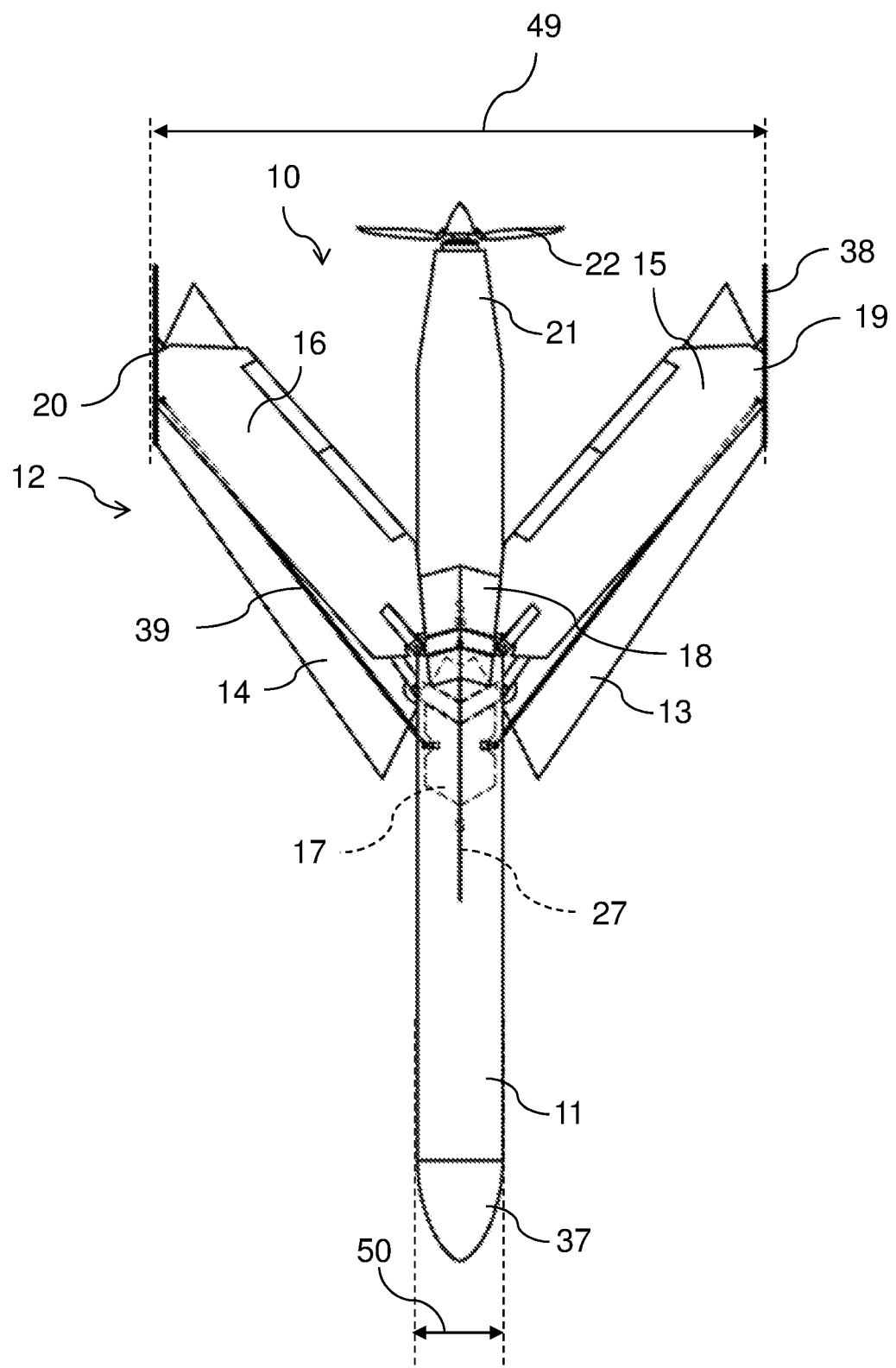
FIG. 3 represents, schematically and in a top view, the aircraft shown in FIGS. 1 and 2, in a configuration with superposed wings.

At least one of the wing-root supports 17 and 18 is able to move along the fuselage 11, which makes possible a deformation of the rhombohedral wing structure 12, a variation in the sweep of each wing and therefore of the span of the wing structure 12. Thanks to these variations, the wing structure 12 can be adjusted for different flight envelopes. FIG. 2 shows the aircraft 10 in a wing structure configuration with a low sweep angle and extended span. FIG. 3 shows the aircraft 10 in a wing structure configuration with superposed wings, high sweep angle and reduced span.

As can be seen in FIGS. 1 to 3, in particular FIG. 2, in the embodiment shown in it, the length 41 of the rear wings 15 and 16 is strictly shorter than the length 48 of the front wings 13 and 14. The angle 42 formed between the main longitudinal axis 44 of the fuselage 11 and the main axis 43 of the rear wings is therefore, in all flight configurations, more obtuse than the angle 46 formed between the main longitudinal axis of the fuselage and the main axis 45 of the front wings. Note that the length of the wings is the largest dimension of the wings measured parallel to their main axis.

Therefore, the front wings 13 and 14 are always in a swept-wing configuration and the rear wings 15 and 16 can be in a swept-forward (FIG. 1), straight (intermediate between the configurations shown in FIGS. 2 and 3), i.e. perpendicular to the fuselage, or swept-back (FIG. 3) configuration, or in any of the intermediate configurations.

In the embodiment shown in FIGS. 1 to 3, at least one of the wing-root supports 17 and 18 (the two wing-root supports, in FIGS. 1 to 3) is configured to come closer to the other wing-root support so that the front wings 13 and 14 form the hypotenuses of right-angle triangles formed by the front wings, the rear wings 15 and 16 and the fuselage 11. The main axis 43 of each of the rear wings is, in these right-angle triangles, perpendicular to the main longitudinal axis 44 of the fuselage.

As can be seen in FIG. 3, at least one of the wing-root supports 17 and 18 (the two wing-root supports, in FIGS. 1 to 3) is configured to come closer to the other wing-root support so that the front wings 13 and 14 and the rear wings 15 and 16 are in swept-back configurations.

Therefore, the sweep of the front wings 13 and 14 can be increased and the span 49 reduced, in particular for flight configurations at the highest speed.

As can be seen in FIGS. 2 and 3, at least one of the wing-root supports 17 and 18 (the two wing-root supports, in FIGS. 1 to 3) is configured to move away from the other wing-root support so that the span 49 (shown in FIG. 3) of the aircraft 10 is less than the sum of four times the maximum width 47 (shown in FIG. 2) of the front wings 13 and 14 and the rear wings 15 and 16, firstly, and the width 50 of the fuselage 11, secondly. Note that the width 47 of the wings is the largest dimension of the wings measured perpendicular to their main axis 43 or 45. In the embodiment shown in FIGS. 1 to 3, the maximum width 47 of the front and rear wings is located on the front wings 13 and 14.

Therefore, the aircraft 10 can be transported, even catapulted, with a wing configuration constricted against the fuselage, with a minimum span. After catapulting in this minimum-span configuration, the span is increased by bringing the wing roots 17 and 18 closer.

Figure 4:
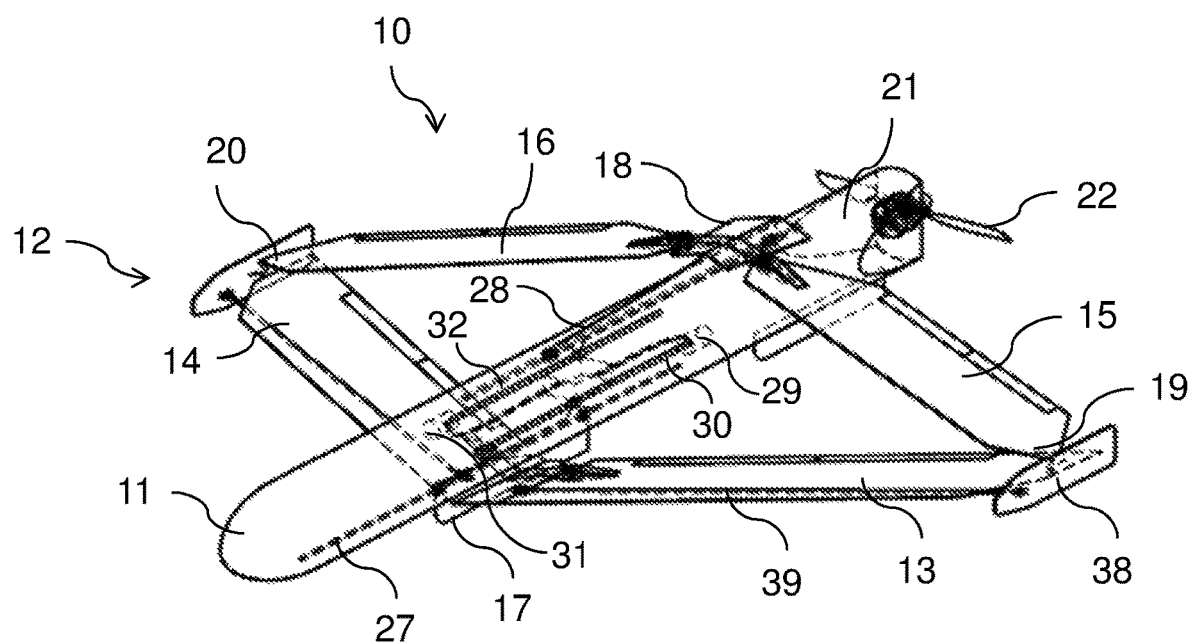
FIG. 4 represents, schematically and in perspective, the aircraft shown in FIGS. 1 to 3, in the configuration shown in FIG. 2.

As shown in FIG. 4, the wing-root supports are preferably positioned respectively under and on the top of the fuselage 11, this configuration being optimum for several aspects. FIGS. 1 to 4 also show that the fuselage 11 has no vertical tail.

Preferably, as shown in the figures, each of the wing-root supports 17 and 18 is able to move along the fuselage. For this purpose, each wing-root support, respectively 17 and 18, is set in motion on a rail, respectively 27 and 28, by an electric motor, respectively 29 and 31, fitted with a worm screw, respectively 30 and 32.

An electronic control unit 37 (see FIG. 3) comprises a central processing unit which actuates the motors 29 and 31 in a coordinated way. The electronic control unit 37 also performs control functions commanding control surfaces 23 to 26 and 33 to 36, in a way known in and of itself.

In addition, the electronic control unit forms a means for adjusting the position of each wing root to suit the flight conditions, for example to the payload, speed, altitude, target autonomy, target maneuverability. The adjustment means alters the geometric configuration of the wing structure by moving at least one wing root.

In some variants, the aircraft 10 comprises means for morphing the wing structure, to alter the inclination of the wings' axes of rotation and cause a variation of incidence, the adjustment means controlling the morphing means. Preferably, in these variants, the electronic unit alters the incidence of the wing structure during the flight, based on the payload, speed, altitude, target autonomy, target maneuverability.

Figure 7:
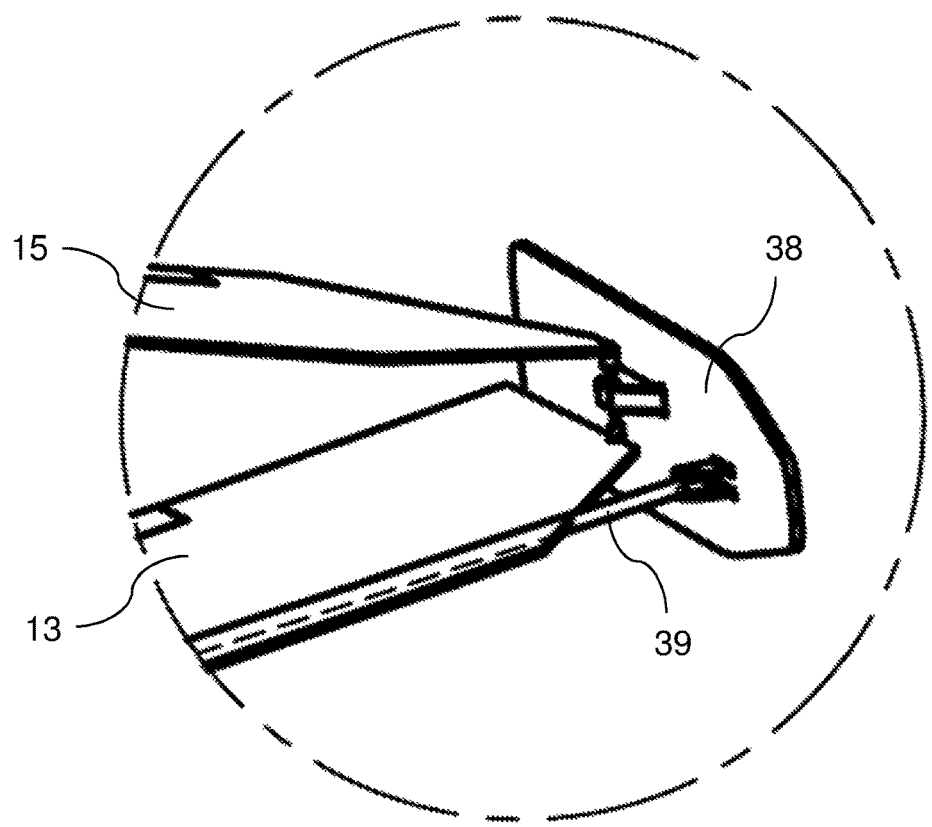
FIG. 7 represents, schematically and in perspective, an articulation of front and rear wing ends.

As shown in the right portion of FIG. 2 and in FIG. 7, a vertical surface for closing wing ends 38 is positioned at each junction 19 and 20 of the front and rear wing ends. A rod 39 inside one of the wings—a front wing in the figures—keeps the main plane of the vertical surfaces for closing wing ends 38 parallel to the main axis of the fuselage 11.

As shown in FIG. 7, the junctions 19 and 20 of the front and rear wing ends comprise pivots. To give a third degree of freedom, over several angular degrees, this pivot link has flexibility or a swivel link.

Figure 5:
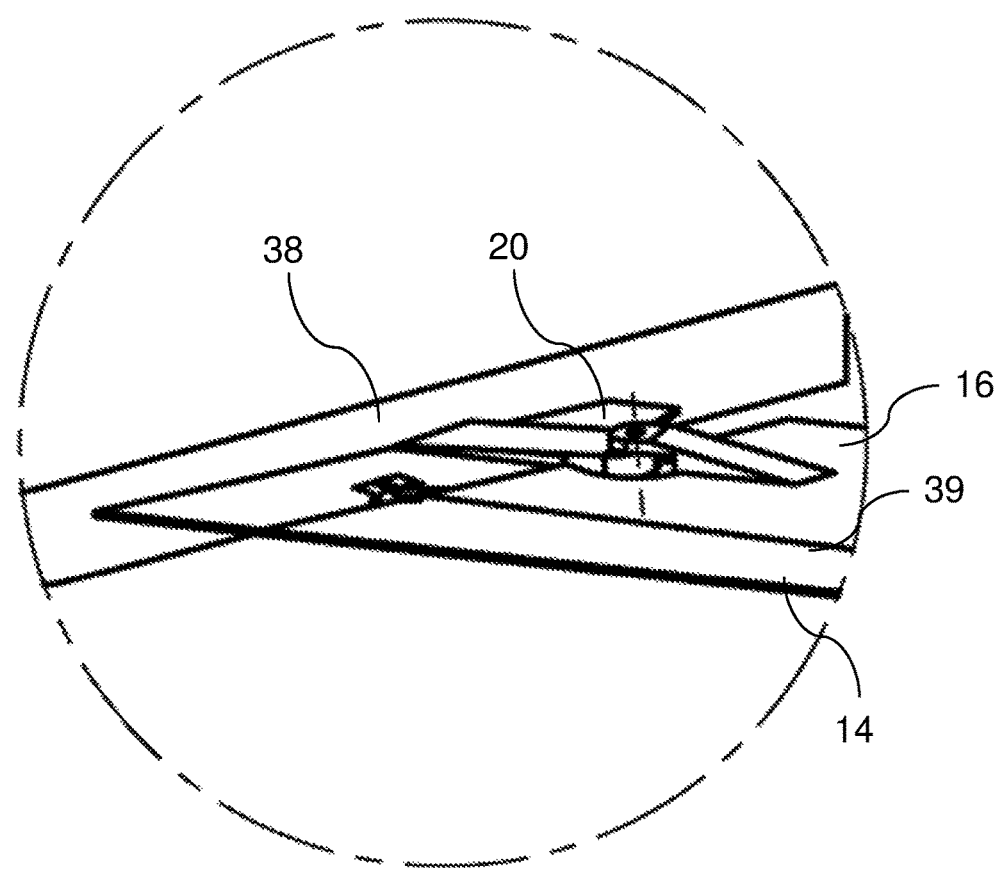
FIG. 5 represents, schematically and in perspective, a movable articulation of a front wing-root support.
Figure 6:
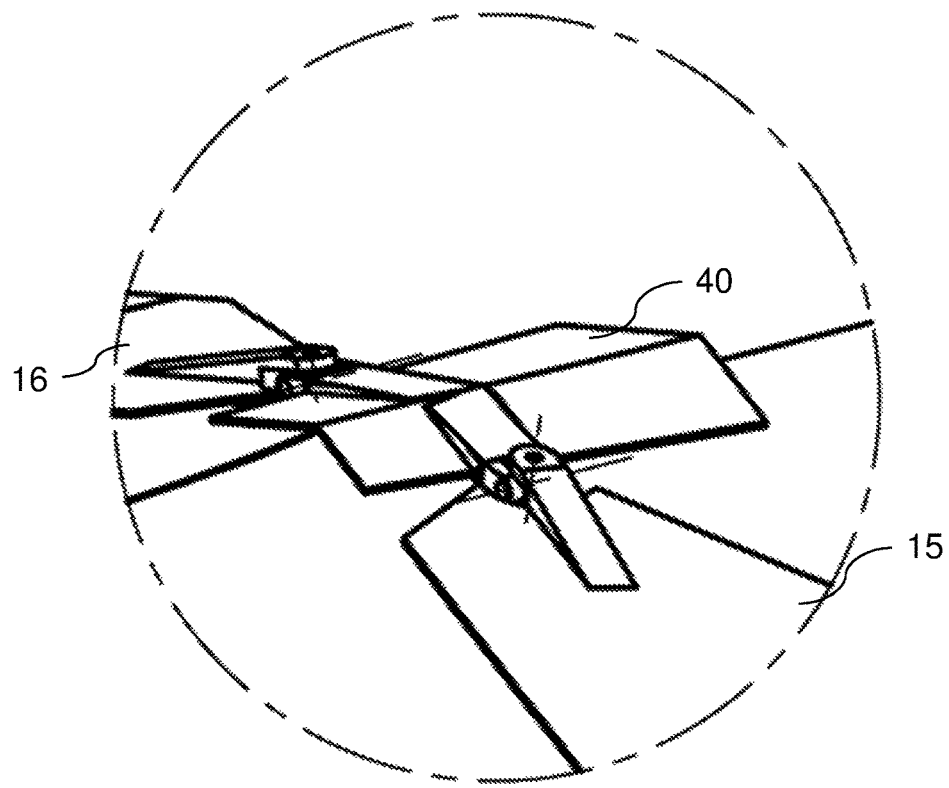
FIG. 6 represents, schematically and in perspective, a movable articulation of a rear wing-root support.

As shown in FIGS. 5 and 6, at least one, and preferably both, wing-root support 17 and 18 comprises pivots and a baseplate 40 moved along the fuselage 11 by the motor, respectively 29 and 31.

Below is a description, with reference to FIG. 3, of an operating mode of the aircraft 10.

The front and rear wings are articulated at the wing root at the point where they are joined to the fuselage, and the right front and rear wings, and similarly the left front and rear wings, are articulated to each other at the ends (tip edges). This articulation point of the wing root and/or end can be located, or not, in the aerodynamic loft of the wing. The aerodynamic loft is the 3D surface of the aircraft used for studies, modeling and simulations. This 3D model can also be used to produce the model for wind-tunnel tests. It is the "perfect" aerodynamic version of the airplane, which will subsequently be adjusted for the production, use, maintenance, regulatory, etc constraints. Therefore, it is essential to conform to this shape/surface as closely as possible in order to have an aircraft whose performance levels are as close as possible to this initial "theoretical" design.

The wing-root articulations with the fuselage can be moved from front to back and independently to obtain the desired geometry while respecting the position constraints for the center of gravity required by the transitional and/or desired planar shape.

These wing-root articulations, while moving longitudinally, can also be moved up and/or down to, for example, obtain the angle of incidence adjusted according to the sweep of the wing. The incidence of the wings is changed according to the configuration of the wing structure so that the profiles of the wings (cross-section parallel to the flow) are always within the values suitable for this configuration. The variations in angle of incidence are, in general, of slight, even very slight, amplitude. This variation in incidence is achieved by the inclination of the wings' axes of rotation. The effect of this inclination on the dihedral (positive or negative) is taken into consideration. On the model shown in the figures, the variations in incidence are of the order of 0.5 angular degrees in a range of variations in incidence extending up to five angular degrees.

The inclination of the wings' axes of rotation where they are joined to the wing root can introduce or eliminate angular variations in incidence. If this axis is perpendicular to the plane of the wing, the dihedral will naturally generate an angular variation in the chord of the wing relative to the frame of reference of the flow of air (the chord of a wing being the cross-section corresponding to the cross-section of the wing dissected by a vertical plane perpendicular to the plane of the wing and parallel to the flow/longitudinal axis "X" of the airplane). It is necessary to ensure, in the case of a change of incidence introduced by the inclinations of the axis of rotation, that the variations are in phase between the front and rear wings so as to minimize any stresses at the ends that might be introduced by the geometry and the choice of degrees of freedom at the level of the mechanism connecting the ends of the front and rear wings to each other.

In some embodiments, the aircraft 10 comprises means for morphing the wing structure, to alter the inclination of the wings' axes of rotation and cause a variation of incidence. In these embodiments, a torsional moment is imposed on the wing roots, by means of their articulation/mounting, and thus a morphing phenomenon is produced by the use, for example, of composite materials and/or a suitable internal structure of the wing.

Morphism is aimed at having a structure whose skin deforms, so as to replace the flight controls (ailerons, flaps, etc) and thus minimize drag (profile and induced). On a cantilever wing, a reshapable internal structure is provided which produces the deformation at the level of the skin (loft) required to obtain the desired/necessary modification in performance (drag, lift). Another solution consists of deforming skins using electromagnetic currents. In the case of the rhombohedral wing structure, because of the "rigid" structure thanks to the bracing on three axes it is possible to introduce stresses in the ends of the wings fairly easily (e.g. for the change in incidence). In some embodiments, a wing is provided whose structure "twists" to increase (or reduce) its incidence at the wing root and/or end. This enables the lift of this wing to be altered, and thus makes it possible to replace the flaps. These variants are, for example, used to modify the characteristics of the wing according to the flight regime.

As detailed earlier, the inclination of the axes of rotation around the points where the wings are joined to the wing roots/ends, and the control and arrangement of the degrees of freedom at the mounts, can introduce stresses either in the longitudinal direction (span) or in the transverse direction (chord) and thus introduce torsional stresses which make possible, for example by acting on the angles of the axes of rotation and with a suitable structure, a constant or scalable twisting over the span of the wing structure. "Buckling" of the wing structure over its span can also be introduced, if considered necessary.

The inventor has discovered that the rhombohedral configuration of the wing structure makes it possible to keep an almost constant lift/drag ratio over a large range of speeds by varying the camber of the front (and rear, to maintain a balanced flight) wings. This particularity has been confirmed in wind-tunnel tests. The use of wing morphing is especially suitable since a small angular variation in the front and rear wings can introduce significant variations in incidence and/or in camber over their span. That makes it possible to limit the use of flap deflections, which have the drawback of the complexity of the mixes of the eight flaps and the lack of precision/resolution of the servomotors and of the mechanical controls of these servomotors.

Morphism is a very elegant solution for "fine-tuning" the adjustment of the wing structure to the flight conditions without having the drawback of solutions that are cumbersome and aerodynamically not very suitable for the multiple flaps on the trailing edge and/or the slats and other appendages on the leading edge. The rhombohedral wing structure lends itself particularly well to this type of "control".

The articulations at the ends of the wings, while leaving the wings freedom to obtain the sweeps/planar shapes desired, can enable the space between the wings to be modified (or not) at their ends in order to optimize the aerodynamic flows and/or meet geometric needs (for example, to allow the wings to be folded along the fuselage).

With regard to the variation in the space between the wings at their ends, it can be of special interest in the case of the configuration for transport and/or catapulting from a tube. For example, a worm screw system is provided for, which varies the space between the planes of the wings directly as a function of the angular position of the two wings relative to each other (mechanically or by slaving).

It is also possible to impose a torsional moment on the ends of the wings, by means of their articulation, and thus introduce a morphing phenomenon by using, for example, composite materials and/or a suitable internal structure of the wing.

The closing of the wing ends, to obtain a wing with an almost infinite aspect ratio, consists of a vertical aerodynamic surface (profiled or not) slaved to the articulation while keeping this surface at the optimum angle of attack for the transitional and/or operational configuration. One of the characteristics of rhombohedral wing structures is the absence of a vertical surface, and therefore a tangible improvement in profile drag. This small vertical surface that joins the two wings at their ends makes it possible to close the space and therefore, in theory, have a wing similar to an infinite-span wing.

Rigid, semi-rigid and/or flexible fairings can enclose the various articulations to ensure good aerodynamic sealing and/or a correct streamline flow.

It is noted that the aircraft 10 can be launched by a catapult, pyrotechnic means and/or a spring. The deployment of the wings on exit from a catapult tube is performed in a few tenths of seconds (i.e. several meters of flight) thanks to springs internal to the aircraft, or by the set of aerodynamic stresses operating on the wing structure.

Figure 8:
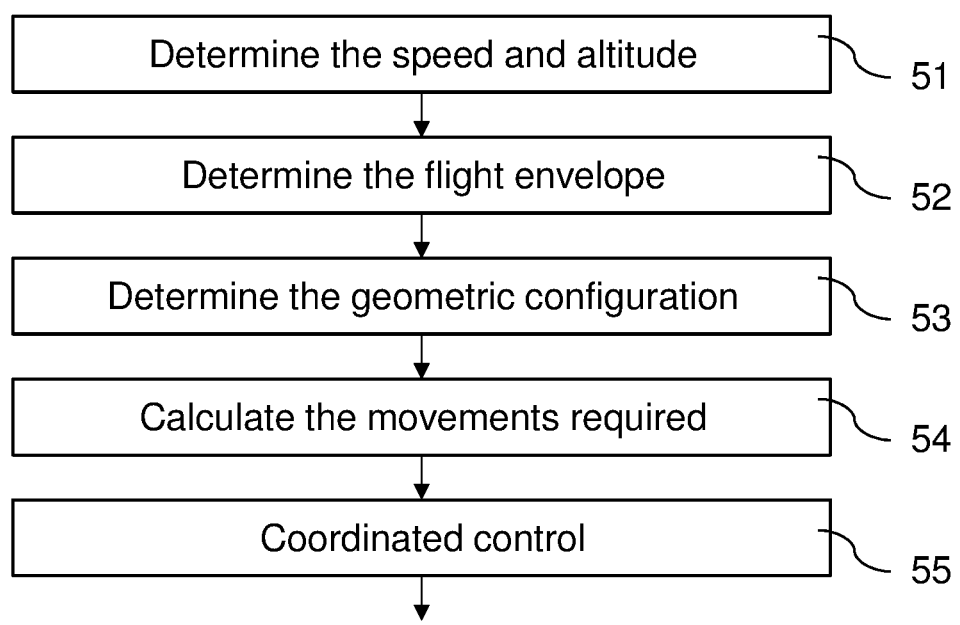
FIG. 8 represents, as a logic diagram, steps in the operation of the aircraft shown in FIGS. 1 to 7.

FIG. 8 represents steps in the operation of the aircraft shown in FIGS. 1 to 7.

During a step 51, the speed and altitude of flight desired are determined, based on the pilot's flight controls or supplied by a flight optimization system for carrying out a mission. During a step 52, the corresponding flight envelope is determined, taking into account the flight conditions (speed, wind, altitude, payload, remaining autonomy, etc). During a step 53, the configuration (dihedral angles and angle of incidence) of the wing structure is determined for this desired flight envelope and/or speed (according to the objectives of stability, reduced consumption, maneuverability, etc). For example, starting from information for certain geometric configurations of the wing structure, including extreme configurations (FIGS. 1 and 3), this information is interpolated for all the other configurations.

During a step 54, the movements of the two wing roots to bring the center of thrust to the desired place, and the movements of the morphing means providing a variation in angle of incidence, are calculated. During a step 55, the stepping motors and servomotors are controlled, in a coordinated and simultaneous way, so that the geometric configuration of the wing structure is achieved.

The invention claimed is:

1. An aircraft comprising:
 a fuselage having a longitudinal axis extending along a horizontal plane and a vertical axis extending along a vertical plane; and
 a rhombohedral wing structure comprising a pair of left and right front wings mounted on a front wing-root support coupled to a front bottom portion of said fuselage and a pair of left and right rear wings mounted on a rear wing-root support coupled to a rear top portion of said fuselage;

wherein:

said right front wing is connected to said right rear wing at a right junction and said left front wing is connected to said left rear wing at a left junction, such that the right and left junctions define a horizontal angle between the wings with respect to said horizontal plane, and a vertical angle between the wings with respect to said vertical plane; and each of the wing-root supports is movable along the longitudinal axis of the fuselage.

2. The aircraft according to claim 1, wherein a length of the rear wings is shorter than a length of the front wings, the angle formed between said longitudinal axis and a main axis of the rear wings is greater than an angle formed between the longitudinal axis and a main axis of the front wings.

3. The aircraft according to claim 2, wherein at least one of the wing-root supports is configured to come closer to the other wing-root support so that the front wings form an hypotenuses of right-angle triangles formed by the front wings, the rear wings and the fuselage, the main axis of each of the rear wings being, in these right-angle triangles, perpendicular to the main longitudinal axis of the fuselage.

4. The aircraft according to claim 2, wherein at least one of the wing-root supports is configured to come closer to the other wing-root support so that the front wings and the rear wings are in swept-back configurations.

5. The aircraft according to claim 1, that comprises a means for adjusting the position of at least one of each wing root to suit flight conditions.

6. The aircraft according to claim 5, that comprises means for morphing the wing structure, to alter an inclination of the axes of rotation of wings and cause a variation of incidence, the means for adjusting controlling the means for morphing.

7. The aircraft according to claim 1, wherein each of the wing-root supports is able to move along the fuselage.

8. The aircraft according to claim 1, wherein each one of said right and left junctions includes a vertical surface for attaching the wings to one another.

9. The aircraft according to claim 8, wherein each one of said right and left junctions comprises a rod inside one of the wings which keeps the main plane of the vertical surfaces for closing wing ends, parallel to the longitudinal axis of the fuselage.

10. The aircraft according to claim 1, wherein said right and left junctions comprise pivots.

11. The aircraft according to claim 1, wherein at least one front wing-root support comprises at least one pivot.

12. The aircraft according to claim 1, wherein the fuselage has no vertical tail.

* * * * *